(«12») United States Patent
Arafat et al.

(10) Patent No.: US 9,344,021 B2
(45) Date of Patent: May 17, 2016

(54) INVERTER CIRCUIT FOR AN ELECTRIC MACHINE

(71) Applicant: GM GLOBAL TECHNOLOGY OPERATIONS LLC, Detroit, MI (US)

(72) Inventors: MD Nayeem Arafat, Clarkston, MI (US); Mohammad N. Anwar, Van Buren Township, MI (US); Syed MD Jaffrey Al Kadry, Northville, MI (US); Mehrdad Teimorzadeh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 14/483,590

(22) Filed: Sep. 11, 2014

(65) Prior Publication Data

US 2016/0079892 A1 Mar. 17, 2016

(51) Int. Cl.
*H02P 6/14* (2006.01)
(52) U.S. Cl.
CPC ........................................ *H02P 6/14* (2013.01)
(58) Field of Classification Search
CPC ...................................................... H02P 6/085
USPC ............. 318/400.28, 400.27, 400.26, 400.01, 318/700
See application file for complete search history.

(56) References Cited

U.S. PATENT DOCUMENTS

| | | | |
|---|---|---|---|
| 5,764,024 A * | 6/1998 | Wilson | 318/805 |
| 6,275,405 B1 * | 8/2001 | Pernyeszi | H02P 27/023 318/768 |
| 7,193,378 B1 | 3/2007 | Welchko | |
| 8,299,737 B2 * | 10/2012 | Morita | H02P 27/08 257/192 |
| 8,513,907 B2 * | 8/2013 | Kondo | H02P 6/14 318/400.27 |
| 2012/0062176 A1 | 3/2012 | Hasan et al. | |

OTHER PUBLICATIONS

Infineon, "SIC-JFET Silicon Carbide-Junction Field Effect Transistor CoolSIC™ 1200 V CoolSIC™ Power Transistor 1JW120R100T1", Final Datasheet Rev. 2.0, Dated Sep. 11, 2013, Power Management & Multimarket, Infineon Technologies AG.

* cited by examiner

*Primary Examiner* — David S Luo
(74) *Attorney, Agent, or Firm* — Quinn Law Group, PLLC

(57) ABSTRACT

An inverter circuit electrically connects between a high-voltage bus and a multi-phase electric machine, including a plurality of switch pairs. Each switch pair includes a first switch electrically connected in series with a second switch at a node. Each node electrically connects to a phase of the multi-phase electric machine with the first switch electrically connected between a positive side of the high-voltage bus and the node and the second switch electrically connected between a negative side of the high-voltage bus and the node. The first switch is configured as a normally-OFF switch. The second switch is configured as a normally-ON switch.

15 Claims, 2 Drawing Sheets

US 9,344,021 B2

INVERTER CIRCUIT FOR AN ELECTRIC MACHINE

TECHNICAL FIELD

This disclosure relates to inverter circuits for electric motor/generators.

BACKGROUND

Electric machines, e.g., multi-phase electric motor/generators have stator windings that are energized by alternating current from inverter modules that electrically connect to high-voltage DC electrical power buses. During specific operating conditions, including high-speed, low or no load conditions, an electric machine, e.g., a permanent magnet (PM) motor may operate in an uncontrolled generator (UCG) mode, wherein motor back-emf increases, resulting in a motor output voltage that is greater than voltage on the high-voltage bus. This excess output voltage may result in a charging current flow through one or more of the diodes arranged in parallel to the switches of the inverter to the high-voltage battery. The charging current flow occurring in the UCG mode may result in excess current through components of the inverter or overcharging of the high-voltage battery that can negatively affect service life of the inverter or the high-voltage battery. Designers may select electrical component design factors and derating schemes that comprehend occurrence of excess charging in UCG modes.

SUMMARY

An inverter circuit electrically connects between a high-voltage bus and a multi-phase electric machine, including a plurality of switch pairs. Each switch pair includes a first switch electrically connected in series with a second switch at a node. Each node electrically connects to a phase of the multi-phase electric machine with the first switch electrically connected between a positive side of the high-voltage bus and the node and the second switch electrically connected between a negative side of the high-voltage bus and the node. The first switch is configured as a normally-OFF switch. The second switch is configured as a normally-ON switch.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
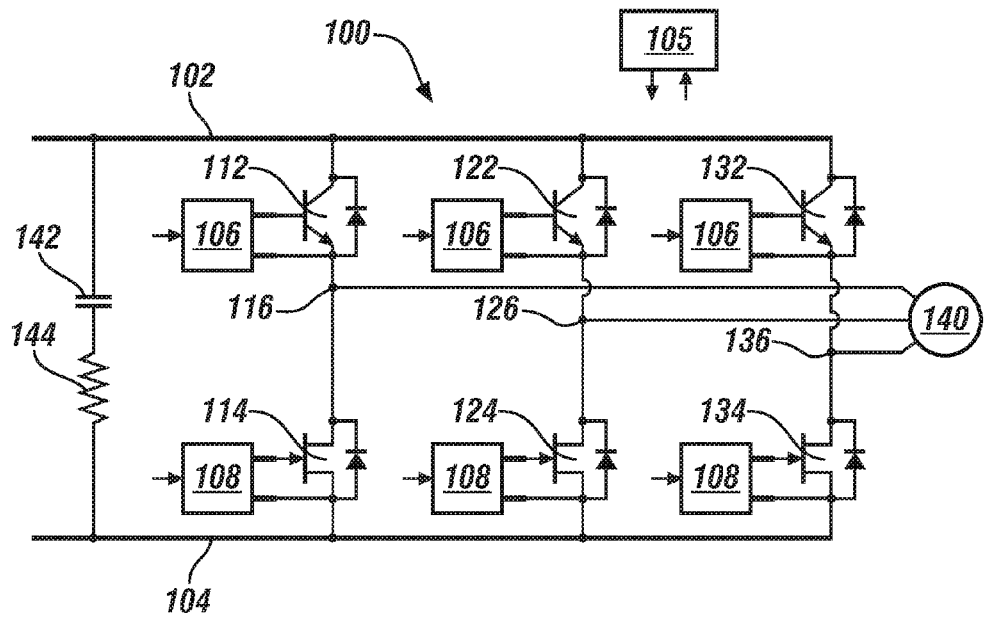
FIG. 1 schematically illustrates a first embodiment of an inverter circuit for controlling operation of a multi-phase electric machine, in accordance with the disclosure.

Referring now to the drawings, wherein the depictions are for the purpose of illustrating certain embodiments only and not for the purpose of limiting the same, FIG. 1 schematically illustrates a first embodiment of an inverter circuit 100 for controlling operation of a multi-phase electric machine 140. The multi-phase electric machine 140 is configured as a three-phase permanent magnet motor/generator having stator legs arranged in a star configuration, but may be any suitable multi-phase configuration. The inverter circuit 100 electrically connects to a high-voltage DC power source via a positive high-voltage DC power bus (HV+) 102 and a negative high-voltage DC power bus (HV−) 104. The high-voltage DC power source can include a high-voltage electrical energy storage device, e.g., a high-voltage battery or a capacitor, a high-voltage electric power generator or another related device or system. The inverter circuit 100 includes a plurality of switch pairs 112 and 114, 122 and 124, and 132 and 134 electrically connecting in series between HV+ 102 and HV− 104. Each of the switch pairs corresponds to a phase of the multi-phase electric machine 140, with the first switch connecting in series with the corresponding second switch at a node. Specifically, switch pairs 112 and 114 connect in series at node 116, switch pairs 122 and 124 connect in series at node 126 and switch pairs 132 and 134 connect in series at node 136. The nodes 116, 126 and 136 electrically connect to nominal first, second and third phases of the multi-phase electric machine 140 to transfer electric power thereto. A first gate drive circuit 106 controls activation and deactivation of the first, high-side switches 112, 122 and 132 and a second gate drive circuit 108 controls activation and deactivation of the second, low-side switches 114, 124 and 134. The first and second gate drive circuits 106, 108 include any suitable electronic device capable of activating and deactivating the switches 112 and 114, 122 and 124, and 132 and 134 to effect power transfer between one of HV+ 102 and HV− 104 and a phase of the multi-phase electric machine 140 in response to control signals originating at a controller 105. The controller 105 generates control signals that are communicated to the first and second gate drive circuits 106, 108 to activate and deactivate the switches 112 and 114, 122 and 124, and 132 and 134 in response to an inverter switch control mode that can include a pulsewidth-modulated (PWM) mode, a six-step control mode or another suitable control mode. The inverter circuit 100 includes other electrical components including capacitors, e.g., DC bus capacitor 142, resistors, e.g., bus resistor 144 and other electrical circuit components to accomplish functions related to electrical noise suppression, load balancing and the like.

Each of the first switches 112, 122 and 132 is configured as a normally-OFF switch, meaning that the switch conducts electrical current only when activated by the first gate drive 106. In one embodiment, the first switches 112, 122 and 132 are Insulated Gate Bipolar Transistors (IGBTs) each having a diode arranged in parallel. The first switches 112, 122 and 132 each have a gate drive activation voltage of 16V and a gate drive deactivation voltage of −8V in one embodiment, thus effecting the normally-OFF state. The first gate drive 106 activates each of the first switches 112, 122 and 132 to effect current flow thereacross responsive to the inverter switch control mode. Each of the second switches 114, 124 and 134 is a normally-ON switch, meaning that the switch conducts electrical current unless deactivated by the second gate drive 108. The second switches 114, 124 and 134 may be any kind of normally-ON semiconductor switch, including, e.g., Junction Field-Effect Transistors (JFETs), Silicon-Carbide (SiC) JFETs, or other wide bandgap normally-ON switches each having a diode arranged in parallel. The second switches 114, 124 and 134 each have a gate drive activation voltage of 0V and a gate drive deactivation voltage of −8V, thus effecting the normally-ON state. The second gate drive 108 activates each of the second switches 114, 124 and 134 to effect current flow thereacross responsive to the inverter switch control mode. Initially when the first and second gate drive circuits 106, 108 are disabled with the inverter board powered, the first switches 112, 122 and 132 and the second switches 114, 124 and 134 remain in the OFF state, thus avoiding current shoot-through. During operation in absence of a circuit fault, the first and second gate drive circuits 106, 108 generate activation signals to activate and deactivate the first switches 112, 122 and 132 and the second switches 114, 124 and 134 to operate the electric machine 140 to generate torque.

Under a fault condition wherein there is no control power, the gate driver output voltage becomes zero due to connection through a pull-down resistor. The first switches 112, 122 and 132 are in the OFF state and the second switches 114, 124 and 134 are in the ON state, nodes 116, 126 and 136 and corresponding legs from the electric machine 140 are shorted and thus stop occurrence of operation in an uncontrolled generator (UCG) mode. When the electric machine 140 is deployed to provide tractive torque on a vehicle, such as an electric vehicle or a hybrid-electric vehicle, the UCG mode can be caused by vehicle coasting at high speeds due to effects of vehicle momentum when the high-voltage battery is fully charged and unable to accept additional charging.

Figure 2:
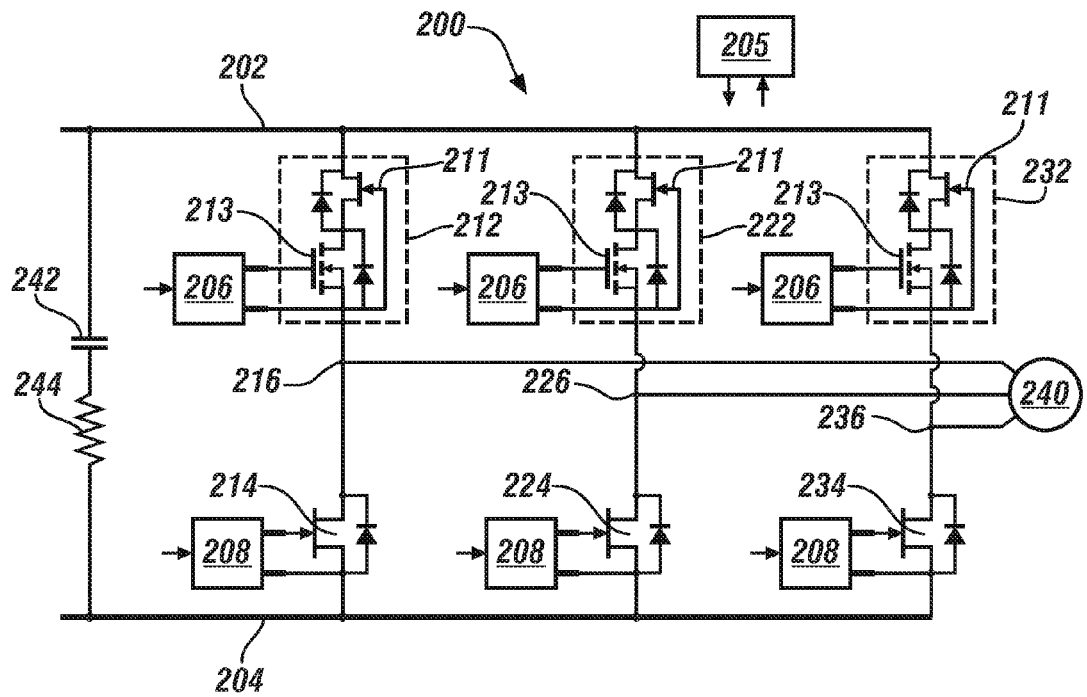
FIG. 2 schematically illustrates a second embodiment of an inverter circuit for controlling operation of a multi-phase electric machine, in accordance with the disclosure.

FIG. 2 schematically illustrates a second embodiment of an inverter circuit 200 for controlling a multi-phase electric machine 240. The embodiment of the multi-phase electric machine 240 is configured as a three-phase permanent magnet motor/generator as shown, but may be any suitable multi-phase configuration. The inverter circuit 200 electrically connects to a high-voltage DC power source via a positive high-voltage power bus (HV+) 202 and a negative high-voltage power bus (HV−) 204. The high-voltage DC power source electrically can include a high-voltage electrical energy storage device, a high-voltage electric power generator or another related device or system. The circuit includes a plurality of switch pairs 212 and 214, 222 and 224, and 232 and 234 electrically connecting in series between HV+ 202 and HV− 204. Each of the switch pairs corresponds to a phase of the multi-phase electric machine 240, with the first switch connecting in series with the corresponding second switch at a node. Specifically, switch pairs 212 and 214 connect in series at node 216, switch pairs 222 and 224 connect in series at node 226 and switch pairs 232 and 234 connect in series at node 236. The nodes 216, 226 and 236 electrically connect to nominal first, second and third phases of the multi-phase electric machine 240 to transfer electric power thereto. A first gate drive circuit 206 controls activation and deactivation of the first, high-side switches 212, 222 and 232 and a second gate drive circuit 208 controls activation and deactivation of the second, low-side switches 214, 224 and 234. The first and second gate drive circuits 206, 208 include any suitable electronic device capable of activating and deactivating the switches 212 and 214, 222 and 224, and 232 and 234 to effect power transfer between one of HV+ 202 and HV− 204 and a phase of the multi-phase electric machine 240 in response to a control signal originating at a controller 205. The controller 205 generates control signals to control the first and second gate drive circuits 206, 208 to activate and deactivate the switches 212 and 214, 222 and 224, and 232 and 234 in a pulsewidth-modulated (PWM) mode, a six-step control mode or another suitable inverter switch control mode. The inverter circuit 200 includes other electrical components including capacitors, e.g., DC bus capacitor 242, resistors, e.g., bus resistor 244 and others to accomplish functions related to electrical noise suppression, load balancing and the like.

Each of the first switches 212, 222 and 232 is configured as a normally-OFF switch, meaning that the switch conducts electrical current only when activated by the first gate drive 206. In one embodiment, the first switches 212, 222 and 232 are cascode switches, each including a JFET switch 211 electrically connected in series with a low-voltage switch 213, which is a p-type metal-oxide semiconductor (LV-pMOS) switch in one embodiment. The cascode switch configuration using LV-pMOS switch converts the first switches 212, 222 and 232 to a normally-OFF configuration during operation in UCG mode. The first switches 212, 222 and 232 each have a gate drive activation voltage of 16V and a gate drive deactivation voltage of −8V in one embodiment, thus effecting the normally-OFF state. The first gate drive 206 activates each of the first switches 212, 222 and 232 to effect current flow thereacross responsive to the inverter switch control mode. Each of the second switches 214, 224 and 234 is configured as a normally-ON switch, meaning that the switch conducts electrical current unless deactivated by the second gate drive 208. In this embodiment, the second switches 214, 224 and 234 are Junction Field-Effect Transistors (JFETs), e.g., Silicon-Carbide (SiC) JFETs, each having a diode arranged in parallel. The second switches 214, 224 and 234 each have a gate drive activation voltage of 0V and a gate drive deactivation voltage of −8V. The second gate drive 208 activates each of the second switches 214, 224 and 234 to effect current flow thereacross, responsive to the inverter switch control mode and to effect the normally-ON state. Under a fault condition wherein there is no control power, the second switches 214, 224 and 234 are in the ON state, nodes 216, 226 and 236 and corresponding legs from the electric machine 240 are shorted and thus stop occurrence of operation in an uncontrolled generator (UCG) mode, wherein motor back-emf increases. The second switches 214, 224 and 234 are configured as SiC JFETs without the additional LV pMOS to make them normally-ON to prevent operation in UCG mode during a fault. This ensures that the AC side is isolated from the DC side during operation in UCG mode. By this the power cannot flow from motor to the DC bus. This reduces likelihood of occurrence of an unintended voltage increase across the DC bus capacitor 242.

The inverter circuits described with reference to FIGS. 1 and 2 employ different types of switches, e.g., Si IGBT, SiC JFET switches that have different solid state structures. The mismatch in the solid state structure is addressed by designing drive capabilities, in terms of impedances, current, etc., of the first and second gate drive circuits (Rg, Ig, Qg, dead-time etc.) to match rise and fall time symmetry for the corresponding switches, and providing switch-appropriate gate voltage selection to effect switch turn-ON and switch turn-OFF. Other features can be implemented to increase the device strength and reduce output impedance of the JFET switches to provide operation that is comparable to the IGBT switch.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds during ongoing operation. Communications between controllers and between controllers, actuators and/or sensors may be accomplished using a direct wired link, a networked communications bus link, a wireless link or any another suitable communications link.

Figure 3:
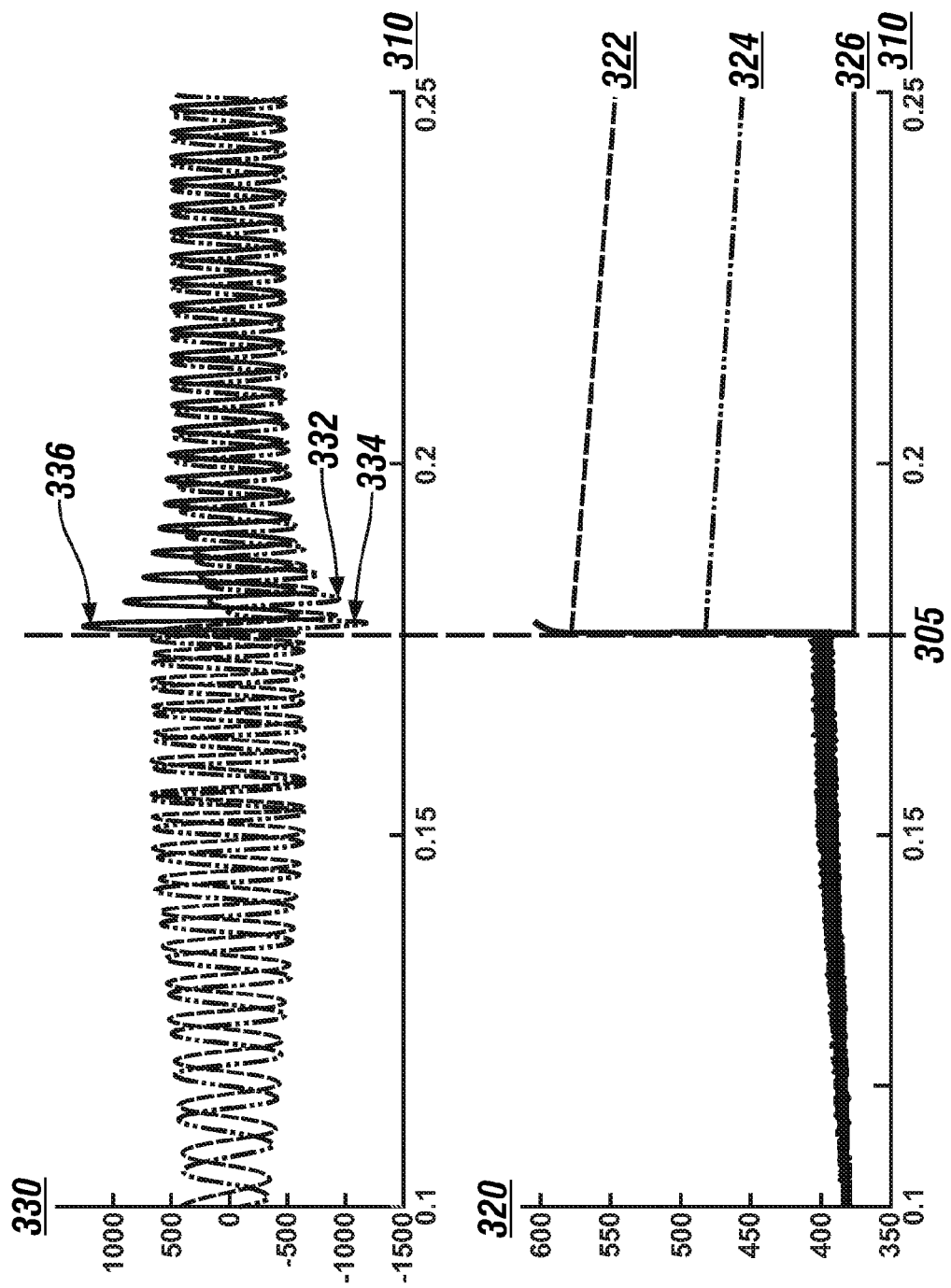
FIG. 3 graphically shows simulated operation of a system including an inverter circuit for controlling a multi-phase electric machine, including DC bus voltage (V) and phase current (A) in relation to time wherein a fault is introduced into the system on the multi-phase side of the inverter, in accordance with the disclosure.

FIG. 3 graphically shows simulated operation of a system including an inverter circuit for controlling a multi-phase electric machine, including DC bus voltage (V) 320 and corresponding phase current (A) 330 on the vertical axis in relation to time 310 on the horizontal axis. At timepoint 305, a fault is introduced into the system on the multi-phase side of the inverter, referred to herein as a three-phase fault. Lines 322 and 332 show operation of a known inverter system wherein the first and second switches are all configured as normally-OFF switches, e.g., all the switches are IGBTs. Lines 324 and 334 show operation of a known inverter system wherein the first and second switches are all configured as normally-OFF switches, e.g., all the switches are IGBTs. Lines 326 and 336 show operation of an embodiment of the inverter circuit described with reference to FIGS. 1 and 2 wherein the first switches are configured as normally-OFF switches and the second switches are configured as normally-ON switches. When a three-phase fault is introduced at timepoint 305, the DC bus voltage of the known system shown by line 322 immediately spikes from less than 400 V to greater than 550 V when the fault includes a three-phase short fault followed by a three-phase open fault. Similarly, when a three-phase fault is introduced at timepoint 305, the DC bus voltage of the known system shown by line 324 immediately spikes from less than 400 V to greater than 460 V when the fault includes a three-phase short fault followed by a contactor close action. In contrast, a three-phase fault is introduced at timepoint 305, the DC bus voltage for inverter circuit described with reference to one of FIGS. 1 and 2 and shown by line 326 actually reduces when the fault includes a three-phase short fault followed by a contactor close action. Such operation enables reducing power rating of the electric machine because the electric machine does not have to be designed to accommodate power surges associated with a fault in the three-phase circuit.

The inverter circuit described with reference to FIGS. 1 and 2 advantageously prevents undesirable overvoltage due to operation in UCG mode, and reduces electromagnetic interference (EMI) associated with time-rate changes in current and voltage. The use of JFET switches reduces packaging size because a SiC JFET switch is physically smaller than an IGBT switch having a similar power rating. The SiC JFET switch also produces less overshoot during ON/OFF switching and reduces switching oscillation and loop inductance when the LV pMOS switch is removed from the low-side, as is described with reference to FIG. 2. The inverter circuit described with reference to FIGS. 1 and 2 also permits designing the power components with lower power ratings since the risk of stress due to overvoltage associated with operation in UCG mode is reduced or eliminated. Furthermore, during operation in UCG mode, the second or lower inverter switches are automatically in the ON state, preventing generated power from flowing from the electric machine into the inverter circuit and dissipated through ancillary circuit components such as DC capacitors, resistors and sensors. Thus, the inverter circuit described with reference to FIGS. 1 and 2 advantageously minimizes or prevents damage to such components by preventing operation in UCG mode and associated high voltage and avoiding a need for power dissipation at high power events.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An inverter circuit electrically connected to a multi-phase electric machine, comprising:
   a plurality of switch pairs, each switch pair including a first switch electrically connected in series with a second switch at a node, each node electrically connected to a phase of the multi-phase electric machine, the first switch of each of the switch pairs electrically connected between a positive high-voltage DC power bus and the node and the second switch of each of the switch pairs electrically connected between a negative high-voltage DC power bus and the node;
   the first switch of each of the switch pairs being a cascode switch that is configured as a normally-OFF switch; and
   the second switch of each of the switch pairs being configured as a normally-ON switch.

2. The inverter circuit of claim 1, wherein each cascode switch includes a JFET switch electrically connected in series with a low-voltage pMOS switch, wherein the cascode switch converts to the normally-OFF configuration when the multi-phase electric machine is operating in an uncontrolled generator (UCG) mode.

3. The inverter circuit of claim 1, wherein the second switch of each of the switch pairs comprises a JFET switch.

4. The inverter circuit of claim 1, wherein the multi-phase electric machine is arranged in a star configuration.

5. The inverter circuit of claim 1, wherein the multi-phase electric machine is arranged in a delta configuration.

6. An inverter circuit electrically connected between a high-voltage DC power bus and a multi-phase electric machine, comprising:
   a plurality of switch pairs, each switch pair including a node electrically connected to a phase of the multi-phase electric machine;
   each switch pair including a first switch electrically connected in series at the node with a second switch, wherein the first switch of each of the switch pairs electrically connects between a positive side of the high-voltage DC power bus and the node and the second switch of each of the switch pairs electrically connects between a negative side of the high-voltage DC power bus and the node;
   a first gate drive circuit electrically operatively connected to each of the first switches and a second gate drive circuit electrically operatively connected to each of the second switches;
   each of the first switches conducting electrical current only when activated by a first gate drive; and each of the second switches conducting electrical current unless deactivated by a second gate drive.

7. The inverter circuit of claim 6, wherein each of the first switches comprises an IGBT switch.

8. The inverter circuit of claim 6, wherein each of the first switches comprises a cascode switch.

9. The inverter circuit of claim 8, wherein each of the first switches includes a JFET switch electrically connected in series with a low-voltage pMOS switch.

10. The inverter circuit of claim 6, wherein each of the second switches comprises a JFET switch.

11. An inverter circuit electrically connected to a high-voltage DC power bus, comprising:
a plurality of switch pairs, each switch pair including a node;
each switch pair including a first switch electrically connected in series at the node with a second switch, wherein the first switch of each of the switch pairs electrically connects between a positive side of the high-voltage DC power bus and the node and the second switch of each of the switch pairs electrically connects between a negative side of the high-voltage DC power bus and the node;
a first gate drive circuit electrically operatively connected to each of the first switches and a second gate drive circuit electrically operatively connected to each of the second switches;
wherein each of the first switches is a normally-OFF switch; and
wherein each of the second switches is a normally-ON switch.

12. The inverter circuit of claim 11, wherein each of the first switches includes an IGBT switch.

13. The inverter circuit of claim 11, wherein each of the first switches includes a cascode switch.

14. The inverter circuit of claim 13, wherein each of the first switches includes a JFET switch electrically connected in series with a low-voltage pMOS switch.

15. The inverter circuit of claim 11, wherein each of the second switches includes a JFET switch.

* * * * *